(12) United States Patent
Mastinu et al.

(10) Patent No.: US 7,278,295 B2
(45) Date of Patent: Oct. 9, 2007

(54) DEVICE FOR MEASURING THE INERTIA TENSOR OF A RIGID BODY

(75) Inventors: Gianpiero Mastinu, Cernobbio-Como (IT); Massimiliano Gobbi, Pavia (IT); Carlo Doniselli, Milan (IT)

(73) Assignee: Politecnico Di Milano, Milan (IT)

( * ) Notice: Subject to any disclaimer, the term of this patent is extended or adjusted under 35 U.S.C. 154(b) by 256 days.

(21) Appl. No.: 10/515,908

(22) PCT Filed: May 30, 2003

(86) PCT No.: PCT/EP03/05781

§ 371 (c)(1),
(2), (4) Date: Jul. 25, 2005

(87) PCT Pub. No.: WO03/102528

PCT Pub. Date: Dec. 11, 2003

(65) Prior Publication Data

US 2006/0010965 A1    Jan. 19, 2006

(30) Foreign Application Priority Data

May 31, 2002   (IT)  ............................ MI2002A1184

(51) Int. Cl.
*G01M 1/00* (2006.01)
(52) U.S. Cl. ........................................... 73/65.08
(58) Field of Classification Search ............... 73/65.08
See application file for complete search history.

(56) References Cited

U.S. PATENT DOCUMENTS

| | | | |
|---|---|---|---|
| 3,106,091 A | | 10/1963 | Korr |
| 5,814,959 A | * | 9/1998 | Nonaka et al. ........ 318/568.11 |
| 5,835,619 A | * | 11/1998 | Morimoto et al. ........... 382/132 |
| 5,841,892 A | * | 11/1998 | McGrath et al. ............. 382/141 |
| 6,425,832 B2 | * | 7/2002 | Cackett et al. ............... 473/345 |
| 6,937,250 B1 | * | 8/2005 | Schilling et al. ............. 345/582 |
| 6,947,879 B2 | * | 9/2005 | Yamada et al. ................. 703/2 |
| 6,983,637 B2 | * | 1/2006 | Nesbit et al. ............... 73/12.02 |

FOREIGN PATENT DOCUMENTS

DE            41 33 376           5/1992

OTHER PUBLICATIONS

Buyanov Ev: "A Device for Measuring the Inertia Tensor of a Rigid Body" Measurement Techniques, Consultants Bureau NY,US, vol. 34, No. 6, Jun. 1, 1991 pp. 585-589.

* cited by examiner

*Primary Examiner*—Max Noori
(74) *Attorney, Agent, or Firm*—Hedman & Costigan P.C.; James V. Costigan

(57) ABSTRACT

A device for measuring the inertia tensor of a rigid body at least consists of a rigid body (11), the inertia tensor of which is to be measured, at least one suspension means (20) with respect to at least one fixed point which sets at least one degree of fixation, excitation means (30) for causing the movement of the rigid body (11), as well as a movement detection group (40) and a data transmission group (50) to a numerical processor (60) for registering the data and executing a parameter identification procedure based upon a mathematical model of the rigid body suspended like a pendulum, suitable for obtaining the six components of the inertia tensor.

32 Claims, 4 Drawing Sheets

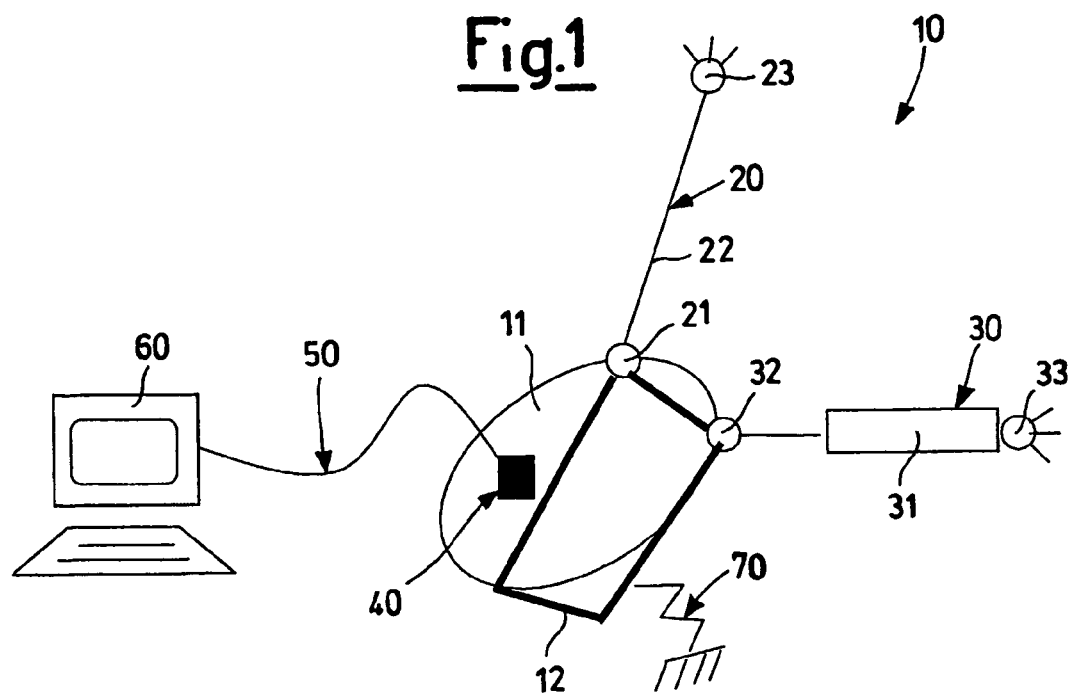
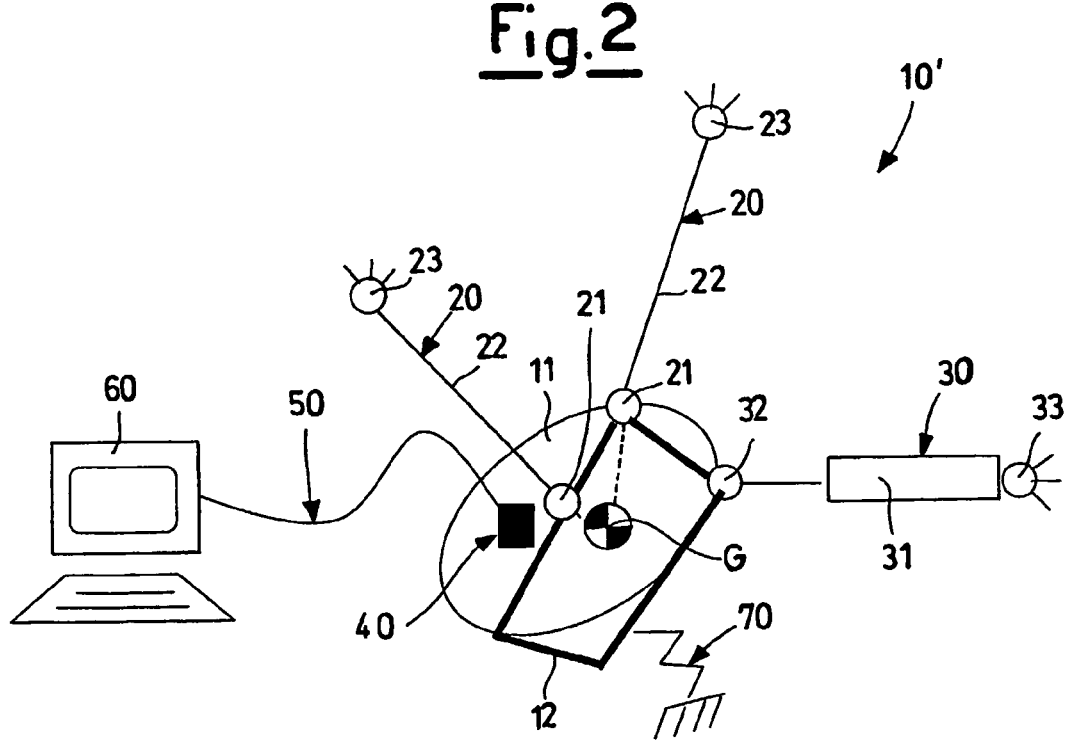

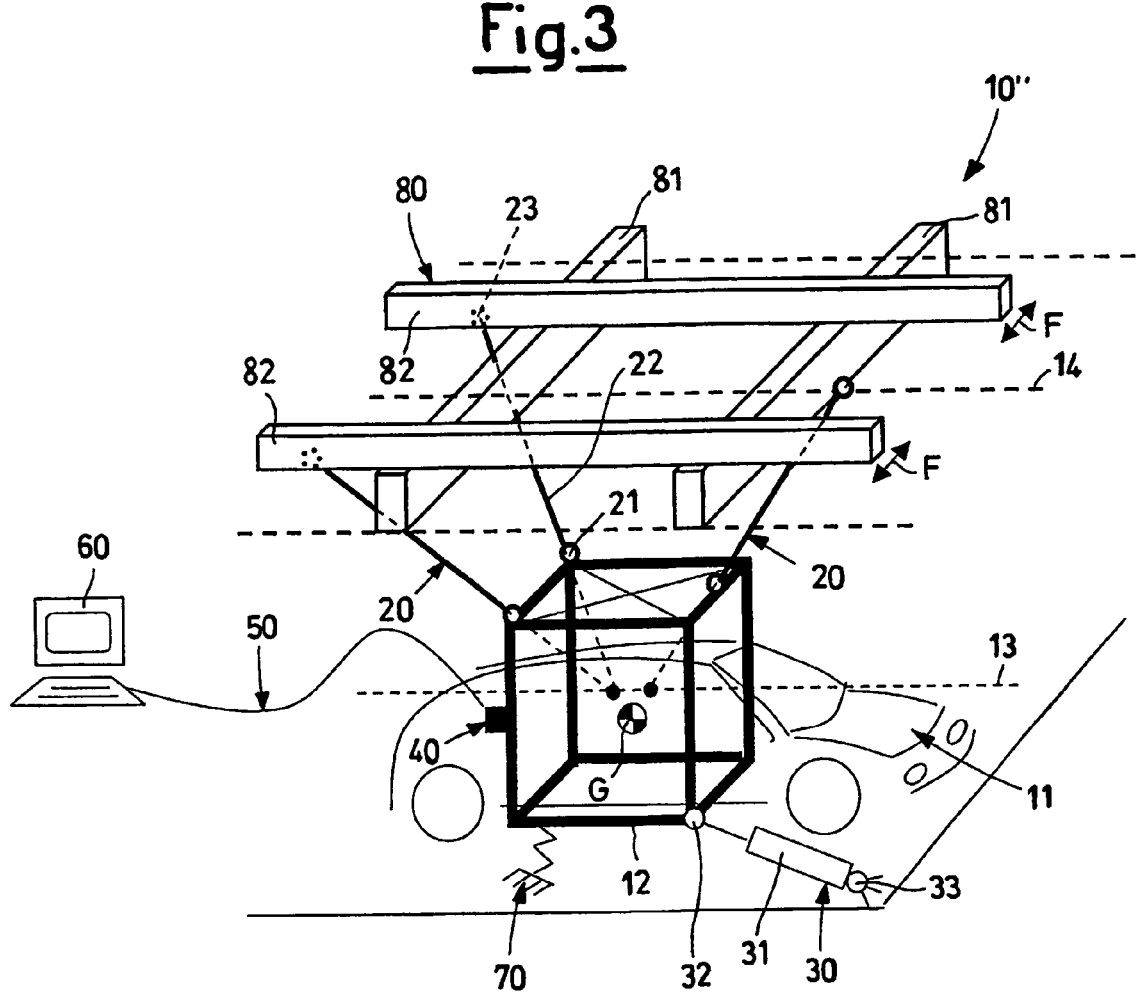

DEVICE FOR MEASURING THE INERTIA TENSOR OF A RIGID BODY

The present invention refers to a device for measuring the inertia tensor of a rigid body.

The dynamic behaviour of multi-body systems can be accurately simulated if accurate measurements of the inertial parameters of the single bodies constituting the system are carried out preliminarily.

It is necessary to obtain precise values for the components of the inertia tensor of a rigid body since, in the simulation of motion, even small variations in the values of the components can considerably influence the results.

Some devices for measuring inertial parameters (mass, centre of gravity and inertia tensor) have been proposed which generally require first of all the determination of the position of the centre of gravity. In such known devices, the rigid body to be measured is made to rotate about a predetermined axis and the value of the moment of inertia about such an axis is worked out by measuring the frequency of oscillation. The complete inertia tensor can thus be measured by repeating the measuring procedure for six differently orientated axes of rotation. This procedure is laborious, because the need to modify the orientation of the axes with respect to the rigid body requires either a very special hardware, or alternatively substantial difficulty in repositioning (in at least six different positions) the rigid body on the device. The measuring devices developed are therefore rather complicated (or often impossible) to be used, especially when the body under consideration is relatively large and heavy as an automobile or an aircraft.

The purpose of the present invention is that of realising a device for measuring the inertia tensor of a rigid body which allows the rigid body to rotate about a generic axis which is continuously variable in space.

Another purpose is that of realising a precise and reliable device.

Another purpose of the present invention is that of realising a measuring device which is particularly simple and functional, with contained costs.

These purposes according to the present invention are accomplished by realising a measuring device as outlined in claim 1.

Further characteristics are foreseen in the dependent claims.

Figure 4:
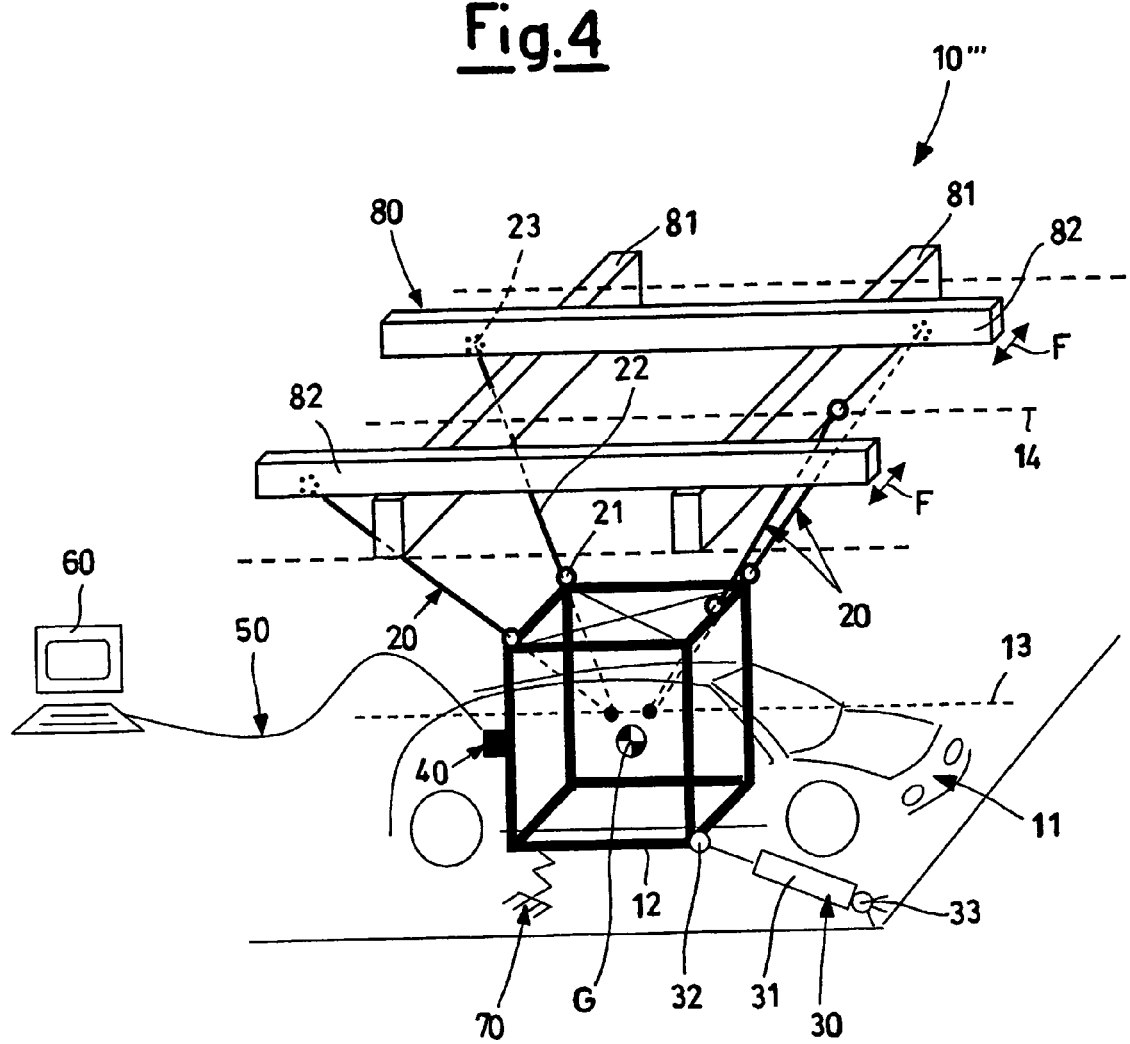
Figure 5:
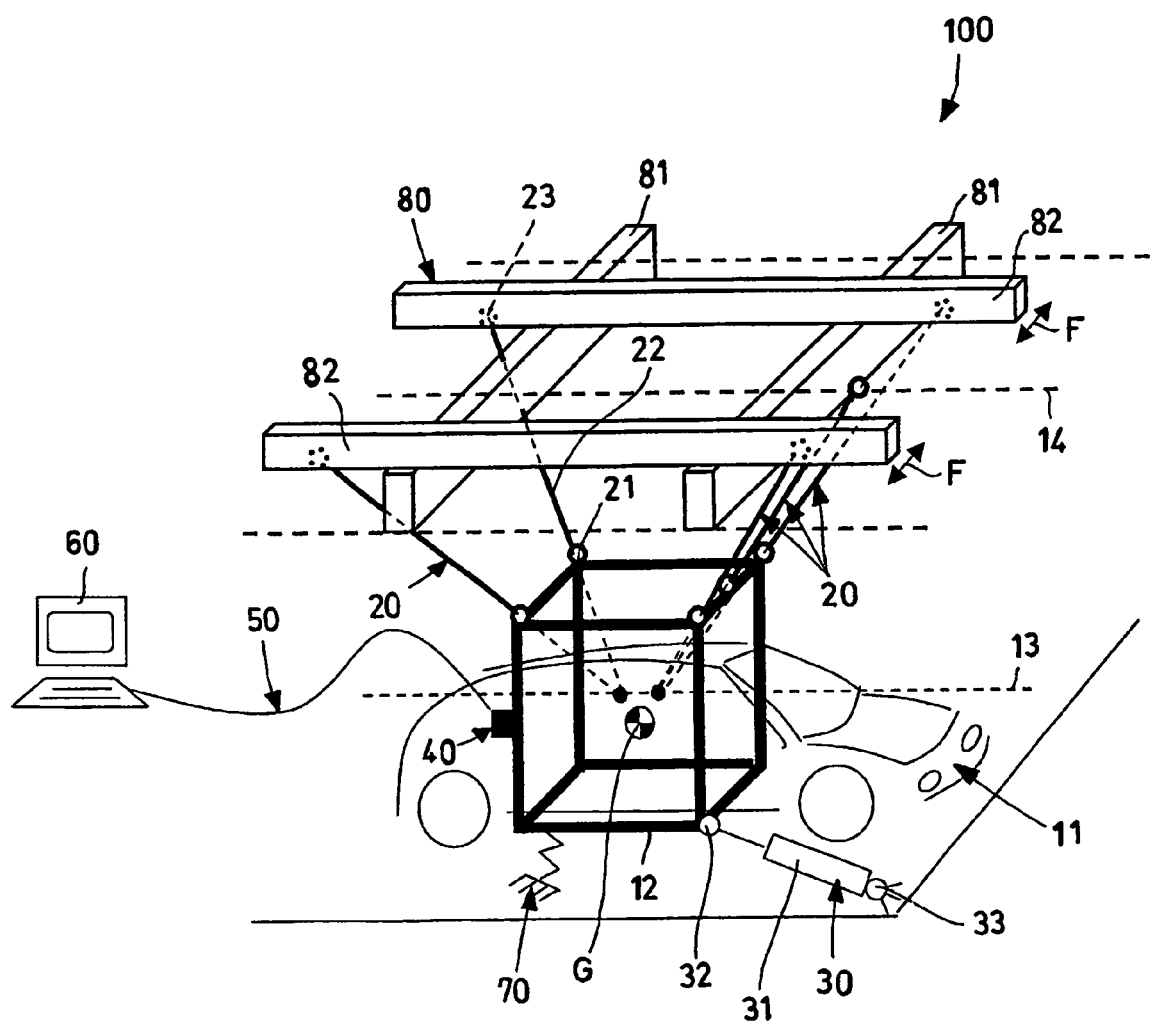

The characteristics and advantages of a device for measuring the inertia tensor of a rigid body according to the present invention shall become clearer from the following description, given as an example and not for limiting purposes, referring to the attached schematic drawings, in which:

FIG. 1 schematically shows a first embodiment of a device with five degrees of freedom for measuring the inertia tensor of a rigid body according to the present invention;

FIG. 2 shows a variant of the device of FIG. 1 with four degrees of freedom;

FIGS. 3 to 5 schematically show further embodiments of a device, respectively with three, two and one degree of freedom, for measuring the inertia tensor of a rigid body, according to the present invention, in which the rigid body is for example an automobile.

With reference to the figures, a device for measuring the inertia tensor of a rigid body is shown, wholly indicated with 10, which, in the most simple embodiment, consists of a rigid body 11, the inertia tensor of which one wishes to measure, one or more suspension means 20 with respect to one ore more fixed points, excitation means 30 for inducing the movement of the rigid body 11, as well as a group for detecting movement 40 and a group for transmitting data 50 to a numerical processor 60, for example consisting of a cable.

According to a preferred embodiment, the body 11 is rigidly fixed on a frame 12, for example realised in the form of a plate, held by the suspension means. According to the shape and nature of the rigid body 11, fixing elements of the rigid body 11 to the frame 12, not shown, of the rigid type or with a band, can be used.

In the measuring device 10 of FIG. 1 the frame 12 is connected through a first spherical joint 21 to a cable or shaft 22, in turn connected to the fixed point through a second spherical joint 23.

Rigid clamps can also for example be used in combination with the cable 22 as suspension means 20, suitable for imposing just one degree of freedom, instead of spherical joints 21 and 23, since the five degrees of freedom of the rigid body 11 are ensured by the flexibility of the cable 22.

The motion of the group consisting of the rigid body 11 and the frame 12 is caused by the excitation means 30, schematised in the figures and for example consisting of a linear actuator 31 respectively connected to the frame 12 and to the fixed point through a first spherical joint 32 and a second spherical joint 33.

The excitation means 30 can consist of simple devices suitable for establishing the desired starting conditions, such as a cord connected to the frame, or to the rigid body through, for example, an electromagnetic device, which disconnects from the group consisting of the rigid body 11 and the frame 12 to start the motion.

Alternatively, the excitation means 30 could also consist of a linear actuator or an electric motor (plus gearbox) rigidly connected (directly or indirectly) to the rigid body (and not connected to a fixed point at the ground) and equipped respectively with a translating mass or else an eccentric mass. The excitation can be provided by selecting properly the force amplitude and the frequency in order to obtain a complex motion (harmonic, pre-chaotic or chaotic) of the group made up of the frame 12 and the rigid body 11, with the aim to get a good accuracy and sensitivity of the measuring device 10.

The group made up of the frame 12 and the rigid body 11, shown in FIG. 1, has five degrees of freedom and its movement is registered by the movement detection group 40, for example consisting of movement sensors. The movement of the rigid body 11 can also be biased, in a preferred embodiment, by one or more elastic elements 70 of the linear or non-linear type, with the purpose of producing chaotic or pre-chaotic complex spatial oscillations to improve the accuracy and sensitivity of the measuring device 10.

The elastic elements 70, which can be separated by a clearance with respect to the rigid body 12, for example consist of a spring or a plurality of springs in series and/or in parallel. The elastic elements 70 can be provided (in series and/or parallel configurations) with one or more damping elements, not shown, such as hydraulic dampers or else friction dampers.

The movement sensors, on the other hand, for example consist of three gyroscopes, orientated along three perpendicular axes, and three servo-accelerometers, with axes of sensitivity of which are oriented along three perpendicular axes. In a further embodiment, the movement sensors can consist of five accelerometers plus one gyroscope or additional accelerometer.

The movement sensors can be rigidly fixed to the rigid body 11, to the frame 12 or split between the two.

The signals generated by the detection group 40 are transmitted through the cable 50, which is very flexible, to the acquisition system of the numerical processor 60. In the processor 60 software dedicated to the identification of the components of the inertia tensor of the body 11 under examination is executed, according to the ways described hereafter.

The detection and transmission groups 40, 50 can comprise optical sensors and a telemetry system interfaced with the electronic processor 60.

Moreover, the movement of the rigid body 11 could be detected through load cells, in a number equal to the suspension means, suitable for measuring the respective axial forces.

FIG. 2 schematically shows a second configuration of the measuring device 10', object of the present invention, substantially analogous to that which is described in reference to the device 10 of FIG. 1, and in which a second suspension means 20 of the frame 12 at a fixed point of type totally analogous to the first is added.

In static conditions, the axes of the suspension means are incident at a point near to, or else at, the centre of gravity G of the group made up of the frame 12 and the rigid body 11. This means that the group, during motion, is made to rotate about an axis passing roughly or precisely through the centre of gravity. This allows the sensitivity of the measuring device 10' to be kept as high as possible with regard to the rotary movements necessary for the identification process of the inertia tensor components.

The suspension means 20 can, moreover, comprise one or more elastic or visco-elastic elements.

In FIG. 3 a further configuration for a measuring device 10" according to the present invention is represented.

The frame 12 consists of a substantially cubic structure, suitable for carrying out measurements of the inertia tensor of rigid bodies 11 of substantial sizes, such as automobiles or aircrafts.

Three suspension means 20, consisting of cables or shafts 22, equipped at the ends with very low friction spherical joints 21 and 23, connect the frame to an upper structure 80 made up of four beams 81 and 82, which constitutes attachment elements for the suspension means 20.

Each spherical joint 21 and 23 is, for example, made up of a Hook's joint with rolling bearings and an axial ball bearing, not shown. Alternatively the said Hook's joint can be equipped with flexure bearings instead of rolling bearings. The said spherical joints can be simply air-suspended spherical joints.

In static conditions, the suspension means 20 are oriented so as to converge at or near to the centre of gravity G of the group consisting of rigid body 11 and frame 12. The group is thus made to rotate about an axis of rotation 13 passing roughly or precisely through the centre of gravity G. This allows the sensitivity of the measuring device 10' to be kept as high as possible with regard to the rotary movements necessary for the identification process of the inertia tensor parameters.

Two beams 81 of the upper structure 80, parallel to each other and perpendicular to a longitudinal axis 14, support the other two beams 82, also parallel to each other and able to translate according to the arrows F in a direction perpendicular to the longitudinal axis 14 to obtain positioning of the fixed points which can be modified continuously in a wide range.

The movement of the group, made up of the frame 12 and the rigid body 11, is caused by the excitation means 30 and, in the configuration of FIG. 3, takes place according to three degrees of freedom.

The movement can thus be registered by the movement detection group 40 and transferred to a numerical processor 60 through a data transmission group 50, analogous to that which has already been outlined. FIGS. 4 and 5 schematise measuring devices 10''' and 100, according to the invention, analogous to the device 10" of FIG. 3, respectively equipped with four and five suspension means 20 and consequently with two and one degree of freedom, respectively.

The registered movement data is numerically processed to identify the values of the elements (or components) of the inertia tensor.

The inertia tensor J of a rigid body is defined as $$J = \begin{Bmatrix} J_{xx} & J_{xy} & J_{xz} \\ J_{yx} & J_{yy} & J_{yz} \\ J_{zx} & J_{zy} & J_{zz} \end{Bmatrix}$$

$$J_{xx} = \int_V y^2 + z^2 \cdot dm \quad J_{yy} = \int_V z^2 + x^2 \cdot dm \quad J_{zz} = \int_V x^2 + y^2 \cdot dm$$

$$J_{xy} = J_{yx} = -\int_V xy \cdot dm \quad J_{xz} = J_{zy} = -\int_V yz \cdot dm \quad J_{zx} = J_{xz} = -\int_V xz \cdot dm$$

wherein V is the volume of the body, dn is the generic mass particle, x, y, z the coordinates of the position in space of the mass particle. J is, by definition, real and symmetrical and can thus always be arranged diagonally through a orthogonal transformation $J_{diag} = U^T J U$ ($U^{-1} = U^T$). The diagonal elements of $J_{diag}$ are the eigenvalues of J and are the main moments of inertia. The matrix U is made up of the eigenvectors of the matrix J respectively associated with the three eigenvalues.

Each eigenvector, in its normal form, defines the vector $v = [v_x, v_y, v_z]^T$ of the direction cosines of each individual main axis of inertia.

First of all a first mathematical model is derived which describes the non-linear movement of the rigid body 11 or of the group consisting of the rigid body 11 integral with the frame 12. The differential equations of non-linear motion can be expressed according to the generic matrix form $$M(q,p)\ddot{q} = F(q,\dot{q},p)$$

wherein q is the vector of the free coordinates of the group made up of the frame 12 and the rigid body 11 to be measured, p is the vector of the unknown parameters of the inertia tensor, M is the mass matrix and F are the forces acting on such a group.

The values in output from the mathematical model of the suspended rigid body are the variables referring to the data registered by the movement detection group 40.

By making dq/dt=u and, of course, dp/dt=0, the previous equation system can be reformulated as an ordinary system of differential equations:

$$\begin{cases} \dot{u} = M^{-1}(q, p) F(q, u, p) \\ \dot{q} = u \\ \dot{p} = 0 \end{cases}$$

According to Cauchy's theorem, given the starting conditions $u=u_0$ $q=q_0$ $p=p_0$, the solution of the system of differential equations, which defines the movement of the suspended body 11, exists and is unique. $u=u_0$ $q=q_0$ are given and measured. $p=p_0$ is not known a priori, but the simulated movement and the measured movement shall be able to be superposed, under broad conditions, by a single vector p.

It is assumed that both the mass of the rigid body under examination and the position of its centre of gravity are known, possibly measured in advance.

The measurement of the inertia tensor of a rigid body 11 is carried out by exciting the motion of the group according to different overall starting conditions, after having rigidly fixed the body 11 under examination to the frame 12. For example, for the configuration 10''' with four suspension means 20 of FIG. 4, the movement can be caused according to a pure angle of rotation, a pure pitch angle, or else a combination of the previous two movements. Alternatively, or else in addition, the movement of the group is excited by forced vibrations, generated by the excitation means.

The movement of the group consisting of the rigid body 11 and the frame 12 is recorded for example by the movement sensors. The analogue signal is filtered by a low-pass filter and the filtered signals are sampled and memorised, for example, on a hard disc of the numerical processor 60.

A cost function $C_f$ is worked out from the recorded data.

For the embodiment in FIG. 3, the said cost function $C_f$ reads $$C_f = C_{roll} + C_{pitch} + C_{yaw}$$

$$C_{roll} = e_{roll}^T(J_{xx}, J_{yy}, J_{zz}, \ldots) Q_{roll} e_{roll}(J_{xx}, J_{yy}, J_{zz}, \ldots)$$

$$C_{pitch} = e_{pitch}^T(J_{xx}, J_{yy}, J_{zz}, \ldots) Q_{pitch} e_{pitch}(J_{xx}, J_{yy}, J_{zz}, \ldots)$$

$$C_{yaw} = e_{yaw}^T(J_{xx}, J_{yy}, J_{zz}, \ldots) Q_{yaw} e_{yaw}(J_{xx}, J_{yy}, J_{zz}, \ldots)$$

wherein e is the vector of the error between the recorded data and the corresponding data of the simulation and Q is the matrix of the weights.

The cost function $C_f$ must be minimised through a suitable numerical algorithm, such as a quasi-Montecarlo method, based e.g. upon a Sobol sequence, followed by a gradients method, which ensure a good identification of the components of the inertia tensor of the rigid body under examination.

The described procedure is preliminarily carried out on the frame only, i.e. without the rigid body under examination. This allows the inertia components of the rigid body under examination to be derived later.

The device for measuring the inertia tensor of a rigid body, object of the present invention, has the advantage of not requiring the execution of six distinct measurements of the movement through space of a rigid body biased according to six distinct axes. Indeed, the inertia tensor is worked out by making the rigid body rotate about a generic variable axis, continuously through space.

Moreover, the measuring device, according to the invention can advantageously be used to measure the inertia tensor of rigid bodies having whatever size and shape, even of entire automobiles or aircrafts.

The device for measuring the inertia tensor of a rigid body thus conceived is susceptible to numerous modifications and variants, all covered by the invention. Moreover, all of the details can be replaced with technically equivalent elements.

In practice, the materials used, as well as the sizes, can be whatever according to the technical requirements.

The invention claimed is:

1. Device for measuring the inertia tensor of a rigid body at least consisting of a rigid body (11), the inertia tensor of which is to be measured, at least one suspension means (20) with respect to at least one fixed point, said suspension means (20) imposing at least one degree of restriction, excitation means (30) for causing the movement of said rigid body (11), as well as a movement detection group (40) and a data transmission group (50) to a numerical processor (60) for recording said data and executing a parameter identification procedure based upon a mathematical model of the rigid body suspended like a pendulum, suitable for obtaining the six components of the inertia tensor of said rigid body.

2. Device according to claim 1, characterised in that said rigid body (11) is placed upon a frame (12) carried by said suspension means (20).

3. Device according to claim 2, characterised in that said frame (12) is a plate.

4. Device according to claim 1 or 2, characterised in that said at least one suspension means (20) consists of a flexible cable (22) equipped at the ends with spherical joints (21 and 23).

5. Device according to claim 1 or 2, characterised in that said at least one suspension means (20) consists of a flexible cable (22) equipped at the ends with rigid clamps.

6. Device according to claim 1 or 2, characterised in that said at least one suspension means consists of a shaft (22) equipped at the ends with spherical joints (21 and 23).

7. Device according to claim 1 or 2, characterised in that said at least one suspension means (20) comprises at least one elastic element.

8. Device according to claim 1 or 2, characterised in that said at least one suspension means (20) comprises at least one visco-elastic element.

9. Device according to claim 1 or 2, characterised in that said at least one excitation means (30) consists of a linear actuator (31) connected to said rigid body (11) or frame (12) and to a fixed point through fixing elements (32, 33).

10. Device according to claim 9, characterised in that said fixing elements are spherical joints (32, 33).

11. Device according to claim 1 or 2, characterised in that said excitation means (30) consists of a cord connected to said rigid body (11) or frame (12) through an electromagnetic device suitable for disconnecting said cord from the body (11) or frame (12) to start the motion.

12. Device according to claim 1 or 2, characterised in that said excitation means (30) consists of at least one linear actuator rigidly connected to said rigid body (11) or frame (12), disconnected from the ground and equipped with a translating mass.

13. Device according to claim 1 or 2, characterised in that said excitation means (30) consists of at least one electric motor (plus or without gearbox) rigidly connected to said rigid body (11) or frame (12), disconnected from the ground and equipped with a rotating mass.

14. Device according to claim 1 or 2, characterised in that it comprises elastic elements (70) suitable for fixing said rigid body (11) or frame (12) to a fixed point.

15. Device according to claim 14, characterised in that said elastic elements (70) are of the linear type.

16. Device according to claim 14, characterised in that said elastic elements (70) are of the non-linear type.

17. Device according to claim 14, characterised in that said elastic elements (70) consist of at least one spring.

18. Device according to claim 14, characterised in that said elastic elements (70) are separated by a clearance with respect to the rigid body (11) or frame (12).

19. Device according to claim 14, characterised in that said elastic elements (70) are provided with damping elements.

20. Device according to claim 1, characterised in that said movement detection group (40) comprises movement sensors applied to said rigid body (11).

21. Device according to claim 2, characterised in that said movement detection group (40) comprises movement sensors applied to said frame (12).

22. Device according to claim 20 or 21, characterised in that said movement sensors consist of three gyroscopes and three accelerometers.

23. Device according to claim 20 or 21, characterised in that said movement sensors consist of five accelerometers and one gyroscope or one additional accelerometer.

24. Device according to claim 1 or 2, characterised in that said movement detection group (40) comprises optical sensors.

25. Device according to claim 1 or 2, characterised in that said movement detection group (40) comprises load cells in a number equal to said suspension means (20), suitable for measuring the respective axial forces.

26. Device according to claim 1 or 2, characterised in that said data transmission group (50) comprises flexible cables.

27. Device according to claim 1 or 2, characterised in that said data transmission group (50) comprises a telemetry system interfaced with said numerical processor (60).

28. Device according to claim 1 or 2, characterised in that said parametric identification procedure is based upon a quasi-Montecarlo method and upon a gradient method.

29. Device according to claim 1 or 2, characterised in that said mathematical model of the suspended rigid body is based upon the modal analysis of small vibrations.

30. Device according to claims 1 or 2, characterised in that said suspension means (20) consists of a plurality of cables or shafts (22), the axes of said elements (20) converging at rest near to or at the centre of gravity (G) of said rigid body (11).

31. Device according to claim 1, characterised in that ground attachment elements (80) of the said suspension means (20) can be displaced in order to obtain the desired suspension means (20) configuration.

32. Device according to claim 31, characterised in that said attachment elements consist of an upper structure (80) comprising four beams (81, 82), in which two beams (81), parallel to each other and perpendicular to a longitudinal axis (14), support two beams (82), which are parallel to each other and able to translate in a direction perpendicular to said longitudinal axis (14).

* * * * *